United States Patent
Hsieh

(10) Patent No.: US 9,223,113 B2
(45) Date of Patent: Dec. 29, 2015

(54) OPTICAL LENS AND ELECTRONIC APPARATUS INCLUDING THE LENS

(71) Applicant: Genius Electronic Optical Co., Ltd., Taichung (TW)

(72) Inventor: Tien-liang Hsieh, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 34 days.

(21) Appl. No.: 14/050,285

(22) Filed: Oct. 9, 2013

(65) Prior Publication Data

US 2015/0098009 A1    Apr. 9, 2015

(51) Int. Cl.
  *G02B 9/34*    (2006.01)
  *G02B 13/18*   (2006.01)
  *G02B 13/00*   (2006.01)

(52) U.S. Cl.
  CPC ........... *G02B 9/34* (2013.01); *G02B 13/004* (2013.01); *G02B 13/0045* (2013.01)

(58) Field of Classification Search
  CPC .......... G02B 9/00; G02B 9/34; G02B 9/60; G02B 9/62; G02B 9/64; G02B 13/001; G02B 13/002; G02B 13/004; G02B 13/0045
  USPC ......... 359/708, 713–715, 745–747, 754–758, 359/763, 764, 766, 770–775
  See application file for complete search history.

(56) References Cited

U.S. PATENT DOCUMENTS

| | | | |
|---|---|---|---|
| 2,170,428 A | 8/1939 | Richter | |
| 2,310,502 A | 2/1943 | Warmisham | |
| 2,767,614 A | 10/1956 | Altman | |
| 3,649,104 A | 3/1972 | Edwards et al. | |
| 4,606,607 A | 8/1986 | Kurihara | |
| 5,274,456 A | 12/1993 | Izumi et al. | |
| 5,966,251 A | 10/1999 | Nagahara | |
| 6,043,941 A | 3/2000 | Yamada | |

(Continued)

FOREIGN PATENT DOCUMENTS

| | | |
|---|---|---|
| CN | 2612961 | 4/2002 |
| JP | 2002-365529 | 12/2002 |

(Continued)

OTHER PUBLICATIONS

Handbook of Plastic Optics, edited by Stefan Baumer, 2010, Wiley-VCH Verlag GmbH & Co., Germany, Chapter 9.6, pp. 264-265.

(Continued)

*Primary Examiner* — Darryl J Collins
(74) *Attorney, Agent, or Firm* — Kilpatrick Townsend and Stockton LLP

(57) ABSTRACT

An imaging optical system includes, in order from the object side to the image side, an aperture stop, a first lens element with a positive refractive power having a convex object-side surface, a second lens element with a negative refractive power having a convex image-side surface in the vicinity of an outer circumference, a third lens element with a positive refractive power having a concave object-side surface in a vicinity of an optical axis and a convex image-side surface in the vicinity of the optical axis, and a fourth lens element having a concave image-side surface in the vicinity of the optical axis and a convex image-side surface in the vicinity of the outer circumference. The sum of thicknesses of the first, second, third, and fourth lens elements and the sum of total air gaps therebetween satisfy specific conditions.

17 Claims, 13 Drawing Sheets

(56) References Cited

U.S. PATENT DOCUMENTS

| | | |
|---|---|---|
| 6,476,982 B1 | 11/2002 | Kawakami |
| 6,728,047 B2 | 4/2004 | Sato |
| 6,891,683 B2 | 5/2005 | Schuster |
| 6,917,479 B2 | 7/2005 | Park |
| 6,950,246 B2 | 9/2005 | Amanai |
| 6,982,835 B2 | 1/2006 | Tomioka |
| 6,985,306 B2 | 1/2006 | Abe |
| 7,012,765 B2 | 3/2006 | Matsui |
| 7,035,023 B2 | 4/2006 | Nanba |
| 7,061,694 B2 | 6/2006 | Amanai |
| 7,206,143 B2 | 4/2007 | Kamo et al. |
| 7,215,492 B2 | 5/2007 | Sato et al. |
| 7,274,518 B1 | 9/2007 | Tang |
| 7,295,386 B2 | 11/2007 | Taniyama |
| 7,345,830 B2 | 3/2008 | Shinohara |
| 7,365,920 B2 | 4/2008 | Noda |
| 7,408,723 B1 | 8/2008 | Lin |
| 7,453,654 B2 | 11/2008 | Shinohara |
| 7,535,658 B2 | 5/2009 | Taniyama |
| 8,068,290 B1 * | 11/2011 | Tsai et al. ............... 359/773 |
| 8,395,691 B2 | 3/2013 | Tang |
| 8,537,473 B2 | 9/2013 | Yin |
| 2002/0181121 A1 | 12/2002 | Kawakami |
| 2003/0184883 A1 | 10/2003 | Sato |
| 2004/0012861 A1 * | 1/2004 | Yamaguchi ............ 359/772 |
| 2005/0030645 A1 | 2/2005 | Do |
| 2006/0056068 A1 | 3/2006 | Lee |
| 2006/0238898 A1 | 10/2006 | Shinohara |
| 2007/0008625 A1 | 1/2007 | Park et al. |
| 2007/0081259 A1 | 4/2007 | Noda |
| 2007/0146901 A1 | 6/2007 | Noda |
| 2007/0188891 A1 | 8/2007 | Shinohara |
| 2008/0180817 A1 | 7/2008 | Taniyama |
| 2013/0188264 A1 * | 7/2013 | Hashimoto ............... 359/715 |
| 2014/0043697 A1 * | 2/2014 | Liao et al. ............... 359/715 |

FOREIGN PATENT DOCUMENTS

| | | |
|---|---|---|
| JP | 2003-094150 A | 10/2004 |
| JP | 2003-168780 A | 1/2005 |
| JP | 2003-168781 A | 1/2005 |
| JP | 2003-186642 A | 1/2005 |
| JP | 2005-024889 | 1/2005 |
| JP | 2005-208236 | 4/2005 |
| JP | 2003-402783 A | 6/2005 |
| KR | 10-2003-0054649 | 10/2005 |
| TW | I-279607 | 4/2007 |

OTHER PUBLICATIONS

Sharma, K.D., "Four-element lens system of the Cooke Triplet family: designs," Applied Optics, Mar. 1, 1980, vol. 19, No. 5, pp. 698-701.

* cited by examiner

OPTICAL LENS AND ELECTRONIC APPARATUS INCLUDING THE LENS

CROSS-REFERENCES TO RELATED APPLICATIONS

NOT APPLICABLE

BACKGROUND OF THE INVENTION

The present invention relates to a mobile device and an optical imaging lens thereof, and more particularly to an optical imaging lens having four lens elements and a mobile device incorporated the same.

The current trend in mobile phone manufacturers is to add more functionalities to a mobile phone, such as digital camera functionality. As the profile of mobile phones becomes thinner, there is a need for the optical lens systems to reduce their length while maintaining their optical performance.

US Patent Publication No. 2011/0299178 discloses an optical imaging lens having four lens elements, in which the first lens element has a negative refractive power and the object-side and image-side surfaces are concave, the second lens element has a positive refractive power and the object-side and image-side surfaces are convex. The total length of this design, however, is about 18 to 19 mm, and cannot meet both a tendency to miniaturization and requirement of good optical performance.

US Patent Publication No. 2011/0242683, U.S. Pat. No. 8,270,097, and U.S. Pat. No. 8,379,326 disclose an optical imaging lens having four lens elements, in which the first and second lens elements have a negative refractive power, and the air gap between the first and second lens elements along the optical axis is relatively large, so that the length of the optical imaging lens cannot be effectively reduced.

The present invention provides an optical imaging lens system having four lens elements and a mobile device incorporated the same to solve the above described problems.

DEFINITION OF TERMS

The expression "a lens element with a positive refractive power for negative refractive power)" refers to the refractive power in the vicinity of the optical axis of the lens element having a positive refractive power (or negative refractive power). A convex object side (or image side) surface of a lens element having a convex or concave) surface in a region refers to that region having a convex portion (or concave portion) with respect to the adjacent outer region in the radial direction of that region, and the region has a protruding or depressing surface with respect to the optical axis.

FIG. 13 provides an example cross-sectional view of a lens element to explain the terms that are used in the present invention. As shown in FIG. 13, "I" denotes the optical axis of an exemplary lens element having rotational symmetry along the optical axis. The object side of the lens element has a convex surface in region A, a concave surface in region B, and a convex surface in region C. Region A has a convex surface because the surface of the region A is protruding with respect to the adjacent radial outer region (i.e., region B) and in the direction of the optical axis. Region B is depressed in relation to adjacent region C. Region C is protruding with respect to adjacent region E. The expression "area around the circumference" refers to imaging light rays passing through the area in the vicinity of the circumferential area of the lens element, i.e., the region C. The imaging light rays may include a chief ray Lc and marginal rays Lm. The expression "area in the vicinity of the optical axis" refers to imaging light passing through the region of the optical axis, i.e., the region A. The expression "area in a vicinity of an outer circumference of a lens element" means in the vicinity of the circumference region on the surface of the lens element only where the imaging light passes, such as the region C or D. In addition, the lens element may include an extension portion E configured to mount the lens element to a lens barrel. The desired imaging light rays may pass the extended portion E. Although the extension portion E of the lens element may be part of the optical imaging system, a description and a sketch thereof will be omitted for the sake of brevity.

BRIEF SUMMARY OF THE INVENTION

Embodiments of the present invention provide an imaging optical system having four lens elements. The imaging optical system includes, in order from the object side to the image side, an aperture stop, a first lens element with a positive refractive power having a convex object-side surface, a second lens element with a negative refractive power having a convex image-side surface in the vicinity of an outer circumference, a third lens element with a positive refractive power having a concave object-side surface in a vicinity of an optical axis and a convex image-side surface in the vicinity of the optical axis, and a fourth lens element having a concave image-side surface in the vicinity of the optical axis and a convex image-side surface in the vicinity of the outer circumference. The sum of the thickness of the four lens is ALT, and the sum of the air gaps between the four lens elements is AAG, and they satisfy the relation:

$3.5 \leq ALT/AAG$.

In an embodiment, the back focal length is BFL, and the air gap between the second and third lens elements is AG23, and they satisfy the relation:

$BFL/AG23 \leq 7.6$.

Embodiments of the present invention also provide a portable electronic device with a built-in digital camera. The portable electronic device includes a module housing unit, a lens barrel mounted in the module housing unit, and an optical lens module assembled in the lens barrel. The optical lens module may include, in part, a first lens element with a positive refractive power having a convex object-side surface, a second lens element with a negative refractive power having a convex image-side surface in the vicinity of an outer circumference, a third lens element with a positive refractive power having a concave object-side surface in a vicinity of an optical axis and a convex image-side surface in the vicinity of the optical axis, and a fourth lens element having a concave image-side surface in the vicinity of the optical axis and a convex image-side surface in the vicinity of the outer circumference.

The sum of the thickness of the four lens is ALT, the sum of the air gaps between the four lens elements is AAG, the back focal length is BFL, and the air gap between the second and third lens elements is AG23, and they satisfy the relations:

$3.5 \leq ALT/AAG$, and $BFL/AG23 \leq 7.5$.

The portable electronic device further includes an imaging sensor bonded on a substrate (chip-on-board). In an embodiment, the lens barrel is movable in the direction of the optical axis relative to the imaging sensor. In other words, the back focal length BFL varies depending on the position of the lens barrel with regard to the imaging sensor. The back focal length BFL and the air gap AG23 satisfy the relation $BFL/AG23 \leq 7.6$ to provide a compact device.

BRIEF DESCRIPTION OF THE DRAWINGS

The features of the present invention will be described with exemplary embodiments and accompanying drawings, in which.

DETAILED DESCRIPTION OF THE INVENTION

Embodiments of the present invention provide a four-element optical lens system that has broad applications in portable and wearable electronic devices, such as a mobile phone, a digital still camera, a digital video camera, a tablet, and the like that use a CCD or a CMOS imaging sensor.

Figure 1:
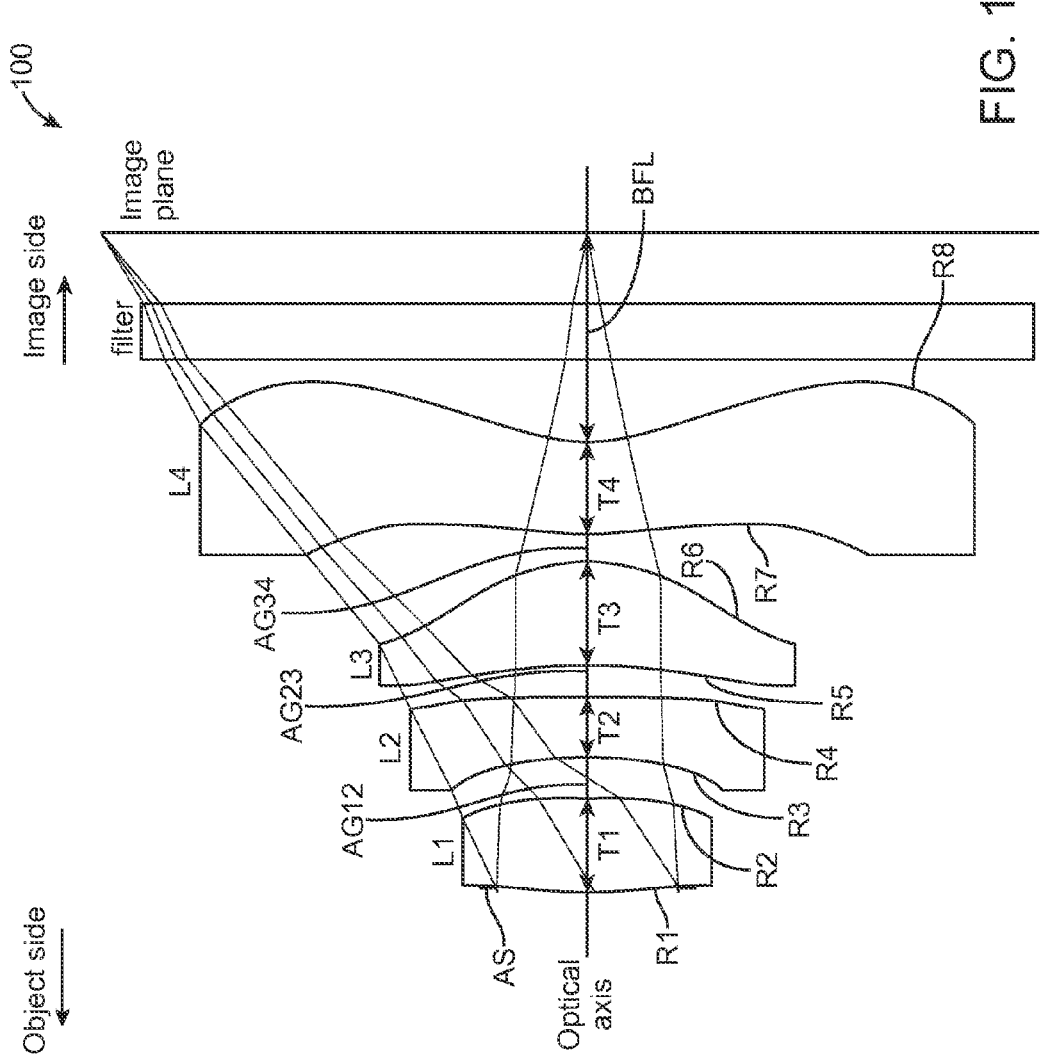
FIG. 1 is a schematic cross-section view of a four-element optical lens system according to a first embodiment of the present invention.

FIG. 1 is a schematic cross-section view of a four-element optical lens system 100 according to a first embodiment of the present invention. Optical lens system 100 includes an optical aperture stop AS, a first lens element L1, a second lens element L2, a third lens element L3, and a fourth lens element L4, in this order from the object side to the image side along the optical axis.

First lens element L1 has a positive refractive power, a convex surface on the object side surface, and a convex surface on the image side along the optical axis. Second lens element L2 has a negative refractive power, a concave surface on the object side surface, a concave surface on the image-side along the optical axis and a convex surface in the vicinity of the outer circumferential region on the image side. Third lens element L3 has a positive refractive power, a concave surface on the object side surface, and a convex surface on the image side along the optical axis. Fourth lens element L4 has a negative refractive power, a convex surface on the object side surface in the vicinity of the optical axis and a concave surface in the vicinity of the circumferential region on the object side surface. The image side of the fourth lens element L4 has a concave surface along the optical axis and a convex surface in the vicinity of the outer circumferential region on the image side. The object-side and image side surfaces of the four lens elements are aspheric. R1 and R2 are the respective object side and image side surface of lens element 1. R1 and R2 are also the respective radius of curvature from the optical axis to the lens surface of lens element 1. Likewise, R3 and R4 are the respective object side and image side surface of lens element 2, and they are also the respective radius of curvature from the optical axis to the lens surface of lens element 2. Similarly, R5 and R6 are the respective object side and image side surface and the respective radius of curvature from the optical axis to the lens surface of lens element 3. R7 and R8 are the respective object side and image side surface and the respective radius of curvature from the optical axis to the lens surface of lens element 4.

Optical lens system 100 also includes an IR cut filter disposed between the fourth lens element and an image plane and configured to filter out infrared rays in incident light.

In FIGS. 1 to 5, T1 is the thickness of the first lens element L1, T2 is the thickness of the second lens element L1, T3 is the thickness of the third lens element L3, and T4 is the thickness of the fourth lens element L4. AG12 is the air gap between the first and second lens elements, AG23 is the air gap between the second and third lens elements, and AG34 is the air gap between the third and fourth lens elements. BFL denotes the back focal length, which is the distance between the image side of the fourth lens element and the image place along the optical axis.

In the following sections, ALT denotes the total thickness of the first to fourth lens elements. AAG denotes the total width of the air gaps of the first to fourth lens elements along the optical axis.

According to embodiments of the present invention, in order to reduce the total length of the optical lens system, the following measures will be taken: reducing the thickness of the lens elements and the air gaps between them. However, it is difficult to reduce the total thickness of the lens elements while maintaining adequate optical performance. Accordingly, the first lens element is designed to have a positive refractive power, the second lens element is designed to have a negative power, and the third lens element has a positive refractive power to augment the refractive power of first lens element. Furthermore, the thickness T1 of the first lens element is made to be small, the total width of the air gaps between the lens elements is constructed to be small. It is difficult to have a small total thickness of the lens elements so the thickness of the first lens element is made to be small. According to embodiments of the present invention, to achieve a compact optical lens system with good optical performance, the following conditions must be satisfied:

$$3.5 \leq ALT/AAG \qquad (1)$$

$$1.0 < T1/T2 \leq 2.1;\ 0.92 \leq T3/T1 \qquad (2)$$

$$5.5 < BFL/AG23 < 7.6;\ BFL/T4 \leq 2.5 \qquad (3)$$

$$T1/AG23 \leq 5.0;\ T2/AG23 \leq 2.7 \qquad (4)$$

$$1.8 \leq T2/AG12 < 2.5;\ 2.3 \leq T4/AG12 \qquad (5)$$

$$0.7 \leq T2/AAG;\ 0.92 \leq T4/AAG \qquad (6)$$

$$2.2 \leq AAG/AG12 \qquad (7)$$

Table 1A shows numeric lens data of optical lens system 100 according to the first embodiment of the present invention.

TABLE 1A

| Embd 1 | Curvature radius | Thickness or gap width | Refractive index | Abbe number | Focal Length | Material |
|---|---|---|---|---|---|---|
| Object | infinity | infinity | | | | |
| Aperture stop | Infinity | −0.0211 | | | | |
| L1 | 1.3937 | 0.3468 | 1.54 | 55.9 | 1.669 | plastic |
| | −2.4094 | 0.1436 | | | | |
| L2 | −2.1843 | 0.2179 | 1.64 | 23.2 | −2.633 | plastic |
| | 7.7836 | 0.1203 | | | | |
| L3 | −1.2075 | 0.3747 | 1.54 | 55.9 | 1.168 | plastic |
| | −0.4635 | 0.1002 | | | | |
| L4 | 1.3908 | 0.3355 | 1.53 | 56.1 | −1.530 | plastic |
| | 0.4715 | 0.2994 | | | | |
| IR cut filter | Infinity | 0.2100 | | | | |
| | Infinity | 0.2547 | | | | |
| Image plane | infinity | | | | | |

In the first embodiment, the effective focal length (EFL) of optical lens system 100 is 1.621 mm. The half of the maximum field of view (HFOV) is 44.040 degrees. The total length from the object-side surface of lens element L1 to the image plane is 2.403 mm. The F number is 2.8. The image height is 1.542 mm.

The aspheric surface of the lens elements can be expressed using the following expression:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

where Y is the perpendicular distance between the point of the aspherical surface and the optical axis, Z(Y) is the depth of the aspheric surface of the lens element (the height of a point on the aspheric surface at a distance Y from the optical axis relative to the tangential plane at the aspheric surface vertex), R is the radius of curvature in millimeters (mm) from the optical axis to the lens surface, K is a conic constant, and a(i) is an aspheric surface coefficient of i-th level (or order term).

Table 1B shows numeric values of the four aspheric lens elements of the first embodiment.

TABLE 1B

| embd1 | Len1 | | Len2 | | Len3 | | Len4 | |
|---|---|---|---|---|---|---|---|---|
| K | 3.249009 | −16.68651 | −5.528903 | 69.76691 | −2.26129 | −2.083758 | −28.17636 | −4.681284 |
| a4 | −0.5818411 | −1.8862657 | −2.6704888 | −1.0904255 | 0.42526598 | −0.438515 | −0.1491464 | −0.3020748 |
| a6 | −1.6343688 | −0.0185467 | −5.7105057 | 2.2881351 | 2.3264556 | 0.74134114 | −0.7833529 | 0.1473268 |
| a8 | −0.7169601 | −2.7145548 | 63.633397 | −1.4306356 | −8.3539117 | 1.7624083 | 1.0857346 | −0.0429649 |
| a10 | −110.34372 | −42.783843 | −156.0634 | −3.2025706 | −0.3770881 | −0.0025285 | −0.2780973 | −0.0156355 |
| a12 | 255.68671 | 243.06961 | 327.62239 | −5.8117222 | 37.801181 | 3.2109413 | −0.5070843 | −0.0038599 |
| a14 | | | −229.65499 | 16.479543 | −49.943519 | −6.3047945 | 0.39762749 | 0.01701589 |
| a16 | | | | | | | −0.0715208 | −0.0069882 |

According to the present invention, the first embodiment provides the following data:

ALT=1.275
AAG=0.364
BFL=0.764
ALT/AAG=3.502 (satisfies the condition (1))
T1/T2=1.591 (satisfies the condition (2))
BFL/AG23=6.352 (satisfies the condition (3))
T1/AG23=2.883 (satisfies the condition (4))
T2/AG12=1.518
BFL/T4=2.277 (satisfies the condition (3))
T4/AG12=2.337 (satisfies the condition (5))
T3/T1=1.080 (satisfies the condition (2))
T2/AAG=0.599
AAG/AG12=2.536 (satisfies the condition (7))
T2/AG23=1.812 (satisfies the condition (4))
T4/AAG=0.912 (satisfies the condition (6))

Figure 6C:
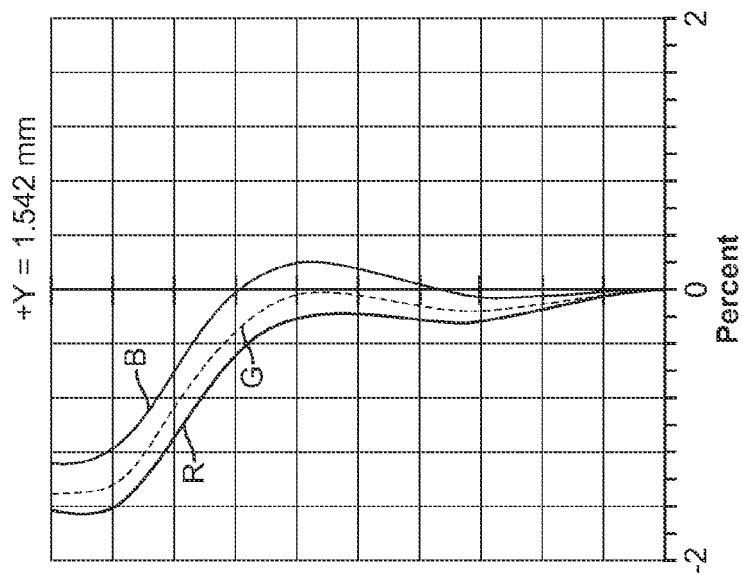
FIGS. 6A, 6B, and 6C show the respective longitudinal spherical aberration, sagittal and tangential astigmatic aberration, and distortion of the first embodiment.
Figure 6B:
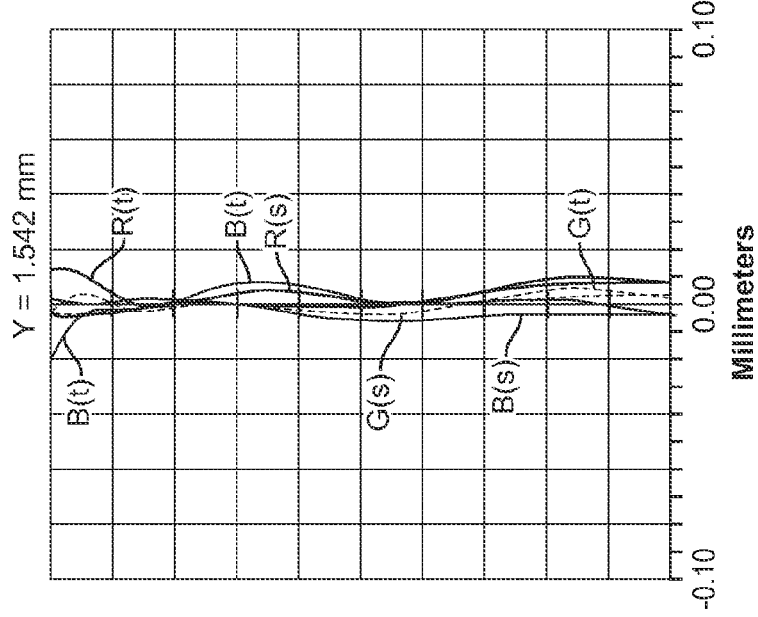
Figure 6A:
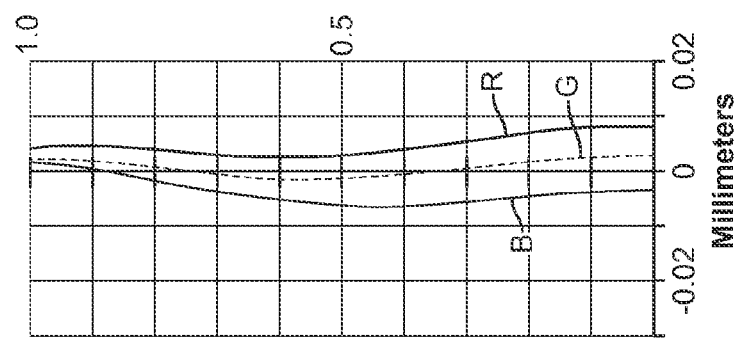

FIGS. 6A, 6B, and 6C show the respective longitudinal aberration, sagittal and tangential aberration, and distortion of the first embodiment. As shown in FIG. 6A, the longitudinal spherical aberration curves for the 470 nm (denoted as "G"), 555 nm (denoted as "B") and 650 nm (denoted as "R") wavelengths are within ±0.1 mm of the image point. The sagittal (denoted as "G(s)," "B(s)," "R(s)") and tangential (denoted as "G(t)," "B(t)," "R(t)") astigmatic aberration for the three wavelengths are within ±0.02 mm (as shown in FIG. 6B). The distortion for the three wavelengths (denoted as "G," "B," and "R") is within ±2.0%.

Figure 2:
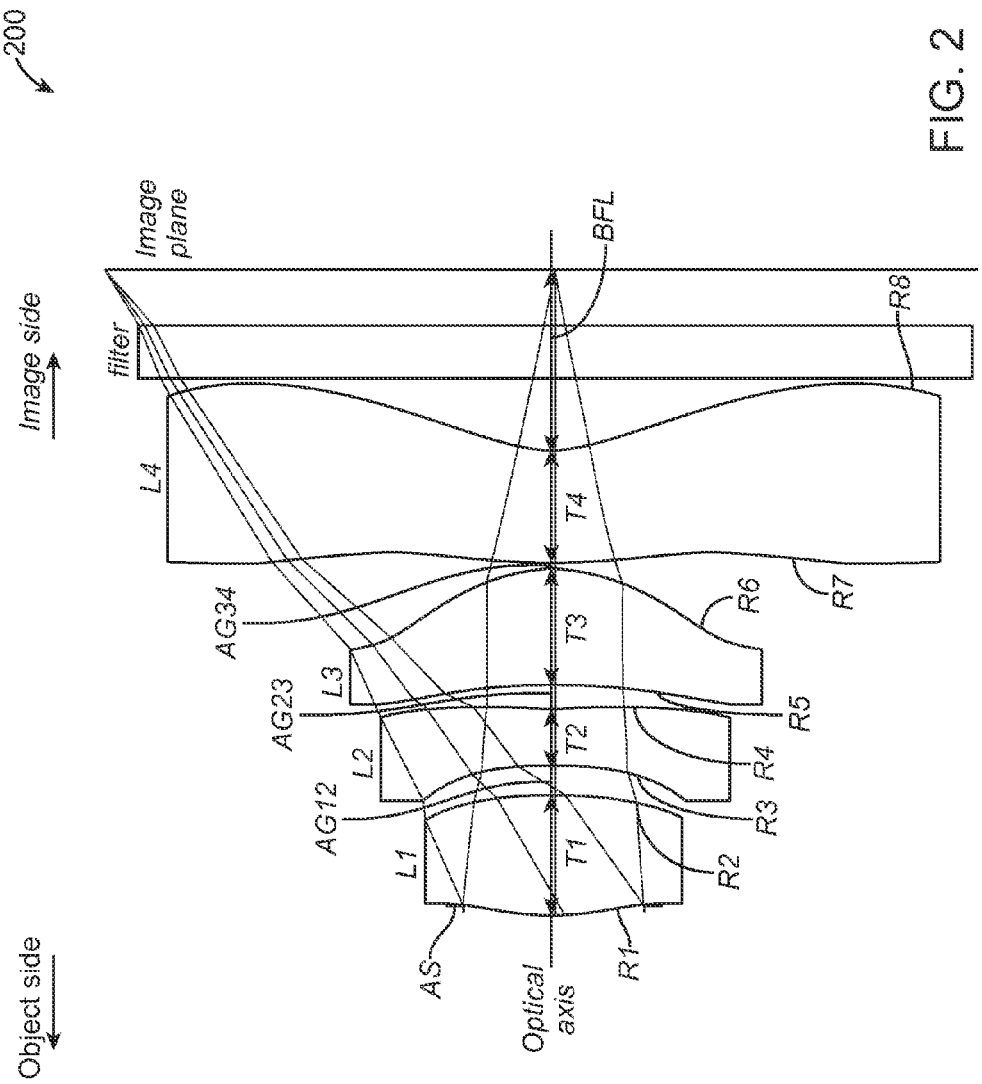
FIG. 2 is a schematic cross-section view of a four-element optical lens system according to a second embodiment of the present invention.

FIG. 2 is a schematic cross-section view of a four-element optical lens system 200 according to a second embodiment of the present invention. Optical lens system 200 has a similar structure as that of optical lens system 100 with the differences in the refractive index of the lens elements, the curvature radius, lens thickness, the air gap width between the lenses, aspheric coefficients, the focal length and other relevant parameters.

Table 2A shows numeric lens data of optical lens system 200 according to the second embodiment of the present invention.

TABLE 2A

| Embd 2 | Curvature radius | Thickness or gap width | Refractive index | Abbe number | Focal Length | Material |
|---|---|---|---|---|---|---|
| Object | Infinity | Infinity | | | | |
| Aperture stop | Infinity | −0.0308 | | | | |
| L1 | 1.2744 | 0.4677 | 1.54 | 55.9 | 1.675 | plastic |
| | −2.8338 | 0.1128 | | | | |
| L2 | −2.7366 | 0.2279 | 1.64 | 23.2 | −2.501 | plastic |
| | 4.0195 | 0.0937 | | | | |
| L3 | −1.3909 | 0.4555 | 1.54 | 55.9 | 1.106 | plastic |
| | −0.4703 | 0.0207 | | | | |
| L4 | 1.7900 | 0.4455 | 1.53 | 56.1 | −1.445 | plastic |
| | 0.4926 | 0.2795 | | | | |
| IR cut filter | Infinity | 0.2100 | | | | |
| | Infinity | 0.2158 | | | | |
| Image | Infinity | | | | | |

TABLE 2A-continued

| Embd 2 | Curvature radius | Thickness or gap width | Refractive index | Abbe number | Focal Length | Material |
|---|---|---|---|---|---|---|
| plane | | | | | | |
| EFL | 1.612 | | | | | |
| HFOV | 44.039 | | | | | |
| Total length | 2.529 | | | | | |
| F number | 2.6 | | | | | |
| Image height | 1.542 | | | | | |

Table 2B shows numeric values of the four aspheric lens elements of the second embodiment.

TABLE 2B

| embd2 | Len1 | | Len2 | | Len3 | | Len4 | |
|---|---|---|---|---|---|---|---|---|
| K   | 5.514859   | −27.33684  | −28.78689  | 17.099     | −1.932214  | −2.292031  | −45.11372  | −5.140042  |
| a4  | −0.4600464 | −1.8230339 | −2.755632  | −1.1008667 | 0.32414394 | −0.5400588 | 0.00424805 | −0.1607812 |
| a6  | −2.2329962 | 0.46165991 | −7.0736825 | 2.3797149  | 2.3427579  | 0.61280851 | −0.7003597 | 0.02420576 |
| a8  | −1.8090949 | 3.2097383  | 69.674748  | −2.4588886 | −8.1832998 | 1.6453655  | 1.0387991  | 0.03272486 |
| a10 | 3.651516   | −43.328161 | −176.87544 | −2.9750847 | −0.5285891 | −0.397518  | −0.2913351 | −0.0188131 |
| a12 | −105.74068 | 93.703525  | 139.94043  | 1.5157087  | 33.277843  | 3.3529506  | −0.5842419 | −0.0060405 |
| a14 |            |            | 92.435433  | −3.5274544 | −45.994252 | −5.7450954 | 0.58162755 | 0.0060579  |
| a16 |            |            |            |            |            |            | −0.1637088 | −0.0011698 |

Figure 7C:
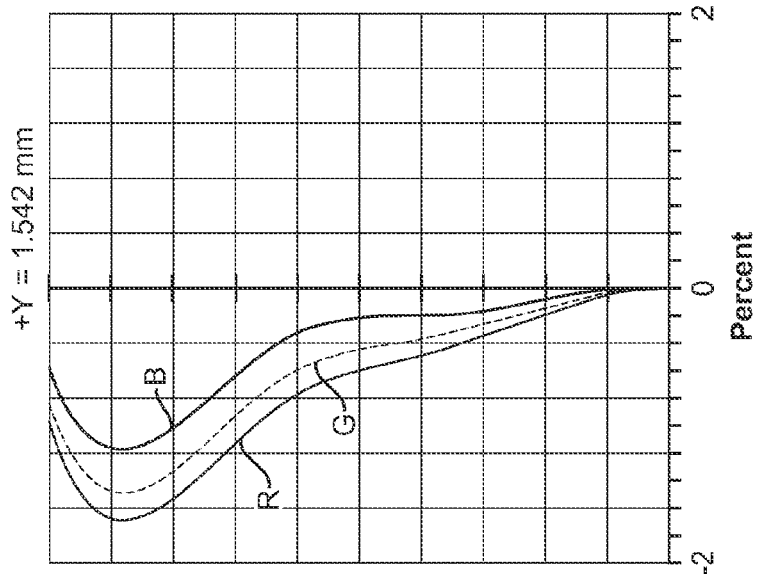
FIGS. 7A, 7B, and 7C show the respective longitudinal spherical aberration, sagittal and tangential astigmatic aberration, and distortion of the second embodiment.
Figure 7B:
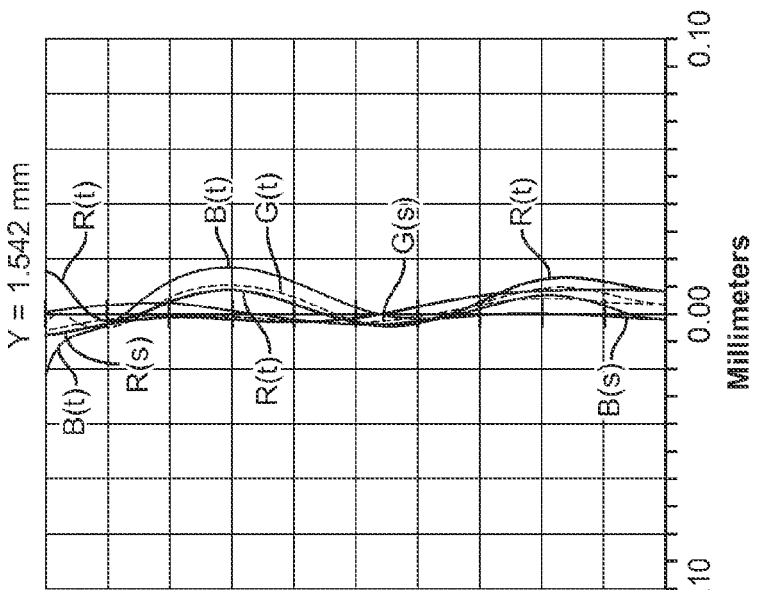
Figure 7A:
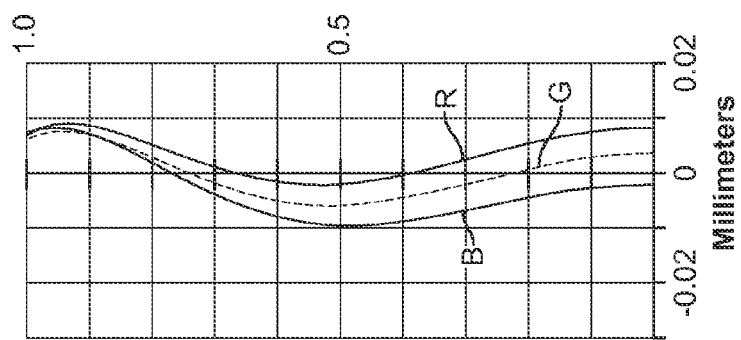

FIGS. 7A, 7B, and 7C show the respective longitudinal aberration, sagittal and tangential aberration, and distortion of the second embodiment. As shown in FIG. 7A, the longitudinal spherical aberration curves for the 470 nm (denoted as "G"), 555 nm (denoted as "B") and 650 nm (denoted as "R") wavelengths are within ±0.1 mm of the image point. The sagittal (denoted as "G(s)," "B(s)," "R(s)") and tangential (denoted as "G(t)," "B(t)," "R(t)") astigmatic aberration for the three wavelengths are within ±0.02 mm (as shown in FIG. 7B). The distortion for the three wavelengths (denoted as "G," "B," and "R") is within ±2.0% as shown in FIG. 7C.

The second embodiment provides the following data:
ALT=1.597
AAG=0.227
BFL=0.705
ALT/AAG=7.027 (satisfies the condition (1))
T1/T2=2.052 (satisfies the condition (2))
BFL/AG23=7.528 (satisfies the condition (3))
T1/AG23=4.992 (satisfies the condition (4))
T2/AG12=2.019 (satisfies the condition (5))
BFL/T4=1.583 (satisfies the condition (3))
T4/AG12=3.947 (satisfies the condition (5))
T3/T1=0.974 (satisfies the condition (2))
T2/AAG=1.003 (satisfies the condition (6))
AAG/AG12=2.013 (satisfies the condition (7))
T2/AG23=2.432 (satisfies the condition (4))
T4/AAG=1.961 (satisfies the condition (6))

Figure 3:
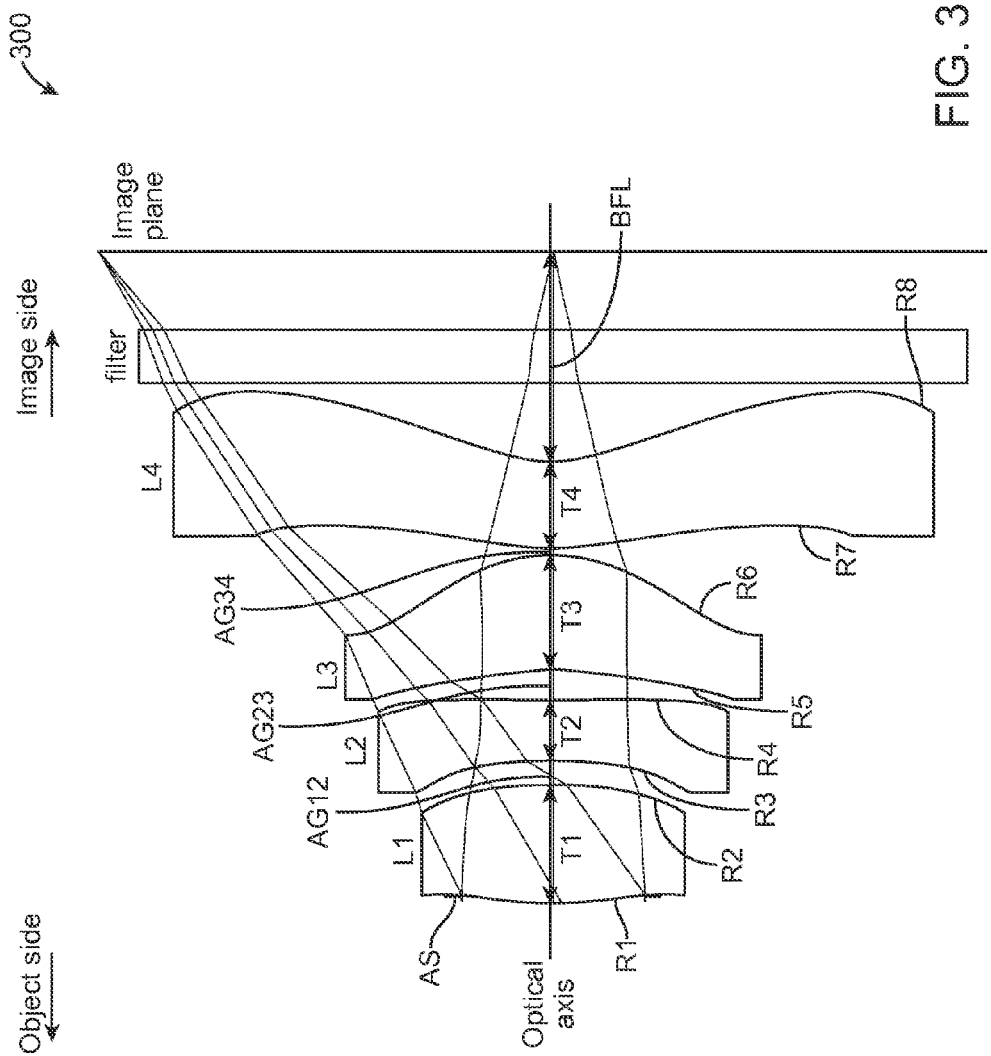
FIG. 3 is a schematic cross-section view of a four-element optical lens system according to a third embodiment of the present invention.

FIG. 3 is a schematic cross-section view of a four-element optical lens system 300 according to a third embodiment of the present invention. Optical lens system 300 has a similar structure as that of optical lens system 100 with the differences in the refractive index of the lens elements, the curvature radius, lens thickness, the air gap width between the lenses, aspheric coefficients, the focal length, and other relevant parameters.

Table 3A shows numeric lens data of optical lens system 300 according to the third embodiment of the present invention.

TABLE 3A

| Embd 3 | Curvature radius | Thickness or gap width | Refractive index | Abbe number | Focal Length | Material |
|---|---|---|---|---|---|---|
| Object | Infinity | Infinity | | | | |
| Aperture stop | Infinity | −0.0264 | | | | |
| L1 | 1.4240 | 0.4559 | 1.54 | 55.9 | 1.721 | plastic |
|    | −2.4590 | 0.1055 | | | | |
| L2 | −3.2908 | 0.2369 | 1.64 | 23.2 | −2.522 | plastic |
|    | 3.2802 | 0.1095 | | | | |
| L3 | −1.2769 | 0.4556 | 1.54 | 55.9 | 1.110 | plastic |
|    | −0.4633 | 0.0324 | | | | |
| L4 | 1.1412 | 0.3350 | 1.53 | 56.1 | −1.630 | plastic |
|    | 0.4434 | 0.3109 | | | | |
| IR cut filter | Infinity | 0.2100 | | | | |
|    | Infinity | 0.3000 | | | | |
| Image plane | Infinity | | | | | |
| EFL | 1.622 | | | | | |
| HFOV | 44.041 | | | | | |
| Total length | 2.552 | | | | | |
| F number | 2.6 | | | | | |
| Image height | 1.542 | | | | | |

Table 3B shows numeric values of the four aspheric lens elements of the third embodiment.

TABLE 3B

| embd3 | Len1 | | Len2 | | Len3 | | Len4 | |
|---|---|---|---|---|---|---|---|---|
| K   | 4.821358   | −5.64879   | −98.47038  | −56.86428  | 0.4479983  | −2.362208  | −16.75703  | −4.546716  |
| a4  | −0.4584414 | −1.894999  | −3.0244506 | −1.0954353 | 0.27375441 | −0.5633454 | 0.03353973 | −0.1899035 |
| a6  | −1.0939246 | 0.25145577 | −6.2752571 | 2.1482236  | 2.3809405  | 0.59171087 | −0.7393983 | 0.03767426 |
| a8  | −1.2852649 | 10.350041  | 75.707548  | −2.449299  | −8.233521  | 1.687559   | 1.0256643  | 0.03315515 |
| a10 | 35.598503  | −31.292604 | −163.96806 | −1.6244962 | −0.0983489 | −0.4016484 | −0.2920906 | −0.0236595 |
| a12 | −481.0974  | 65.334856  | 100.65393  | 3.667175   | 35.056293  | 2.9664167  | −0.5854672 | −0.0065405 |
| a14 |            |            | 55.878045  | −3.8247845 | −42.323936 | −4.947681  | 0.57654107 | 0.00664025 |
| a16 |            |            |            |            |            |            | −0.1568822 | −0.0012984 |

Figure 8A:
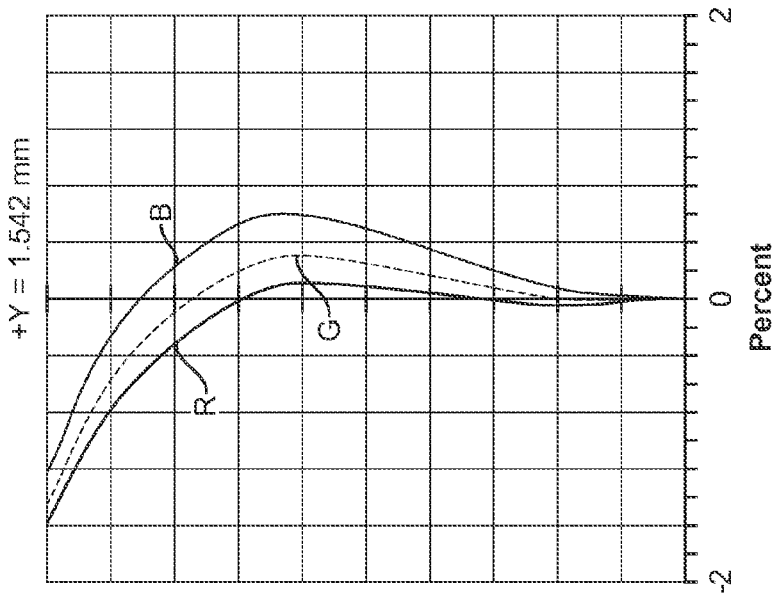
FIGS. 8A, 8B, and 8C show the respective longitudinal spherical aberration, sagittal and tangential astigmatic aberration, and distortion of the third embodiment.
Figure 8B:
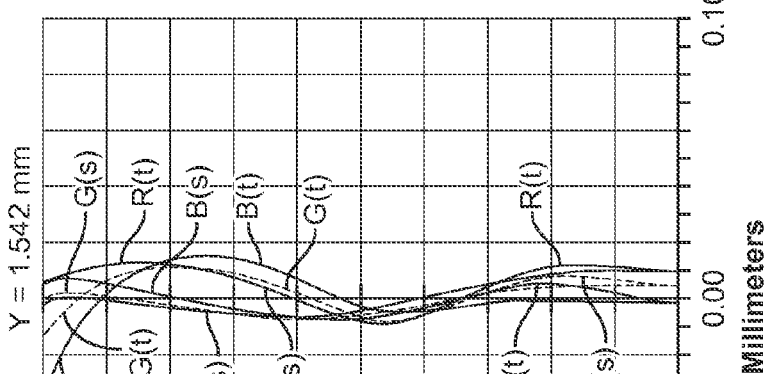
Figure 8C:
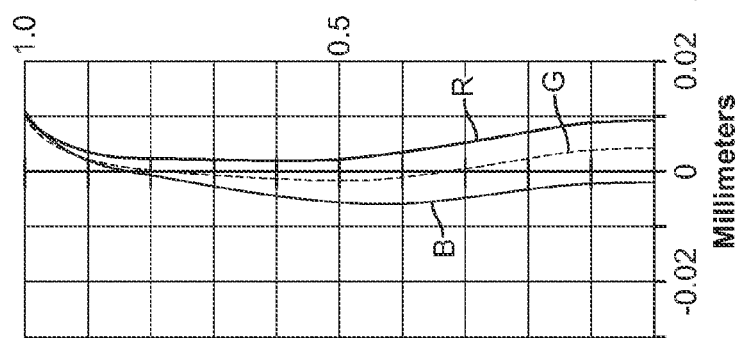

FIGS. 8A, 8B, and 8C show the respective longitudinal aberration, sagittal and tangential aberration, and distortion of the first embodiment. As shown in FIG. 8B, the longitudinal spherical aberration curves for the 470 nm ("G"), 555 nm ("B") and 650 nm ("R") wavelengths are within ±0.1 mm of the image point. The sagittal ("G(s)", "B(s)", "R(s)") and tangential ("G(t", "B(t)", "R(t)") astigmatic aberration for the three wavelengths are within ±0.04 mm (as shown in FIG. 8B). The distortion for the three wavelengths ("G," "B," "R") is within ±1.6% as shown in FIG. 8C.

Figure 4:
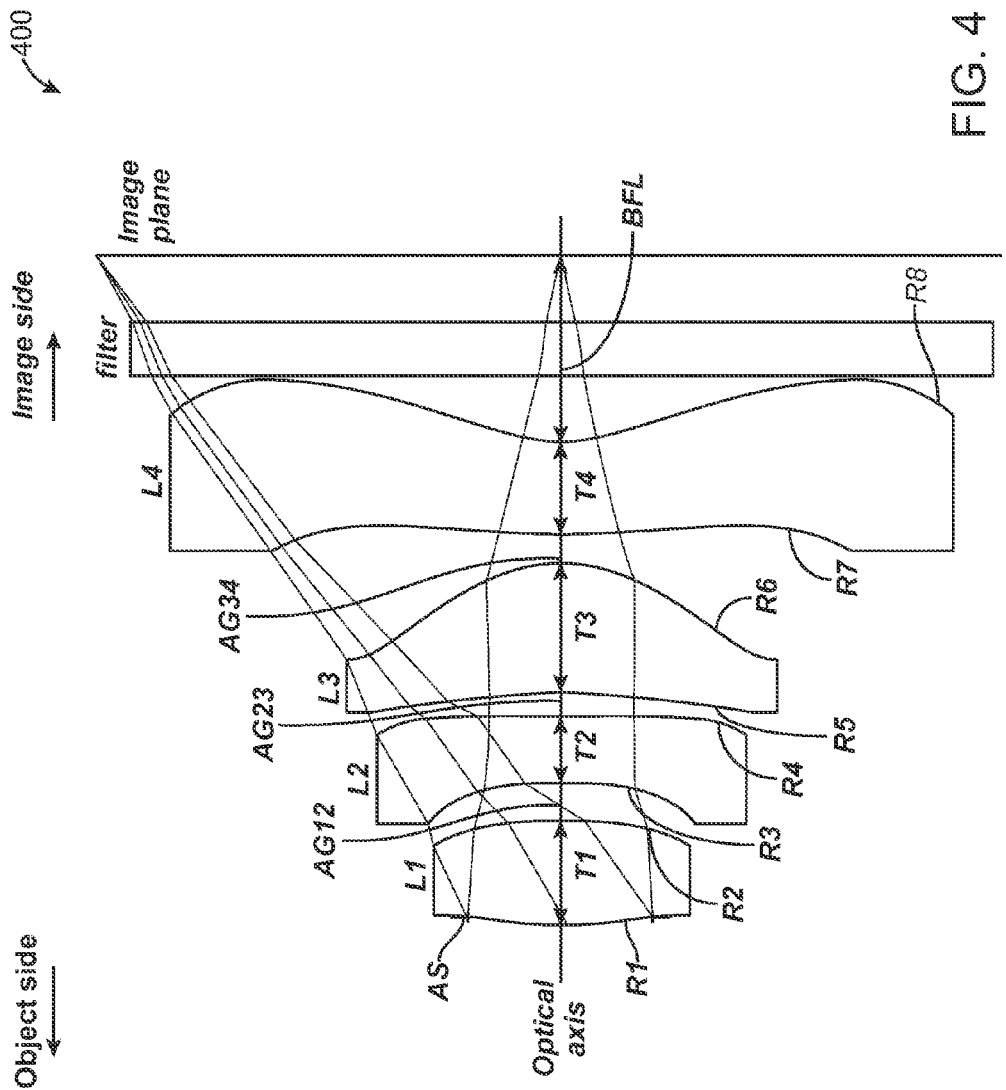
FIG. 4 is a schematic cross-section view of a four-element optical lens system according to a fourth embodiment of the present invention.

FIG. 4 is a schematic cross-section view of a four-element optical lens system 400 according to a fourth embodiment of the present invention. Optical lens system 400 has a similar structure as that of optical lens system 100 with the differences in the refractive index of the lens elements, the curvature radius, lens thickness, the air gap width between the lenses, aspheric coefficients, the focal length and other relevant parameters.

Table 4A shows numeric lens data of optical lens system 400 according to the fourth embodiment of the present invention.

TABLE 4A

| Embd 4 | Curvature radius | Thickness or gap width | Refractive index | Abbe number | Focal Length | Material |
|---|---|---|---|---|---|---|
| Object | Infinity | Infinity | | | | |
| Aperture stop | Infinity | −0.0253 | | | | |
| L1 | 1.4039 | 0.3946 | 1.54 | 55.9 | 1.770 | plastic |
| | −2.8054 | 0.1432 | | | | |
| L2 | −3.1060 | 0.2525 | 1.64 | 23.2 | −2.405 | plastic |
| | 3.1725 | 0.0952 | | | | |
| L3 | −1.4546 | 0.4938 | 1.54 | 55.9 | 1.004 | plastic |
| | −0.4463 | 0.1095 | | | | |
| L4 | 1.7262 | 0.3530 | 1.53 | 56.1 | −1.339 | plastic |
| | 0.4697 | 0.2528 | | | | |
| IR cut filter | Infinity | 0.2100 | | | | |
| | Infinity | 0.2514 | | | | |
| Image plane | Infinity | | | | | |
| EFL | 1.601 | | | | | |
| HFOV | 44.040 | | | | | |
| Total length | 2.556 | | | | | |
| F number | 2.6 | | | | | |
| Image height | 1.542 | | | | | |

Figures 9A, 9B, 9C:
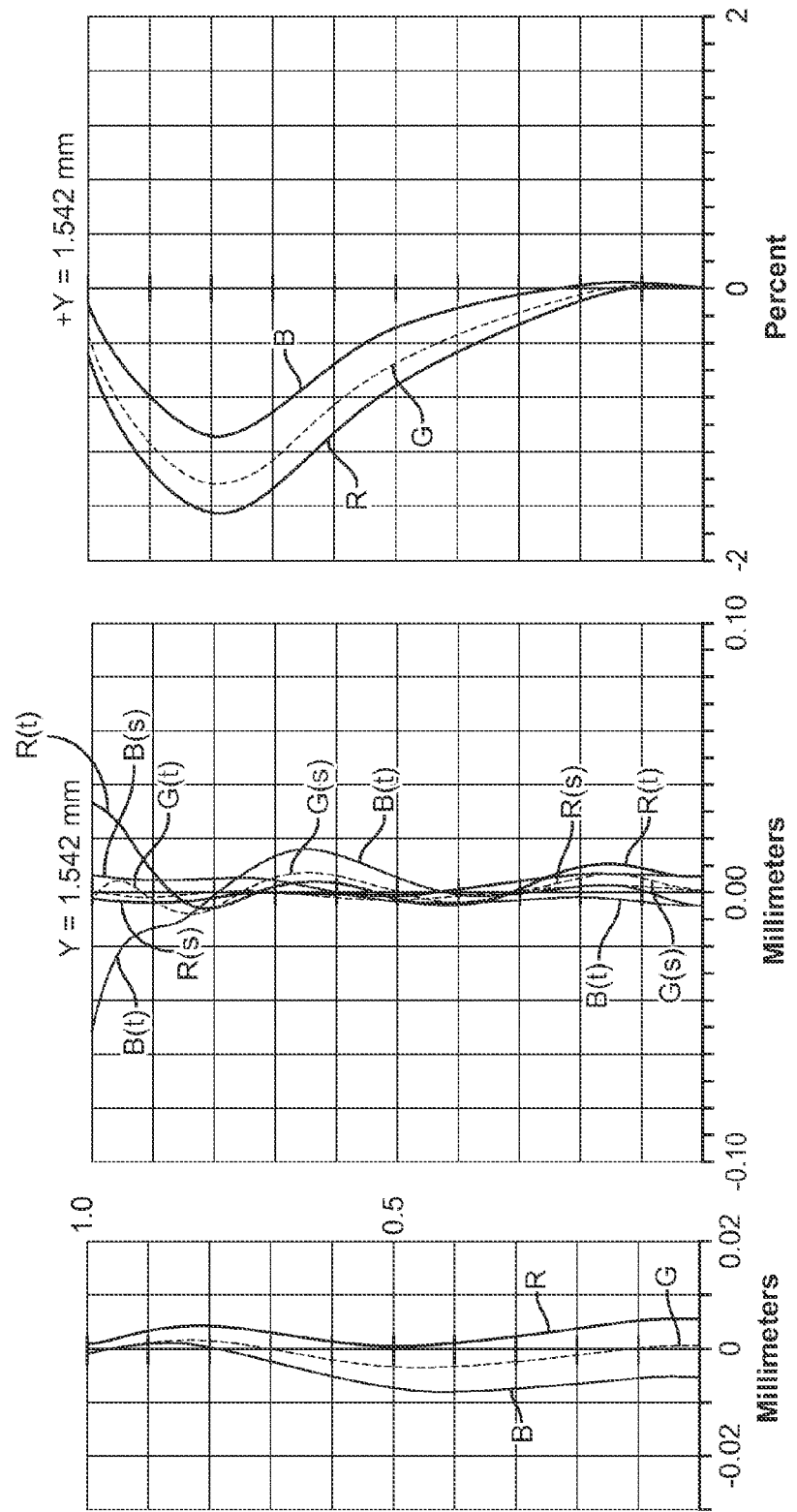
FIGS. 9A, 9B, and 9C show the respective longitudinal spherical aberration, sagittal and tangential astigmatic aberration, and distortion of the fourth embodiment.

FIGS. 9A, 9B, and 9C show the respective longitudinal aberration, sagittal and tangential aberration, and distortion of the fourth embodiment. As shown in FIG. 9A, the longitudinal spherical aberration curves for the 470 nm ("G"), 555 nm ("B") and 650 nm ("R") wavelengths are within ±0.01 mm of the image point. The sagittal ("G(s)", "B(s)", "R(s)") and tangential ("G(t)", "B(t)", "R(t)") astigmatic aberration for the three wavelengths are within ±0.05 mm (as shown in FIG. 9B). The distortion for the three green, blue, and red wavelengths is within ±2.0% as shown in FIG. 9C.

Figure 5:
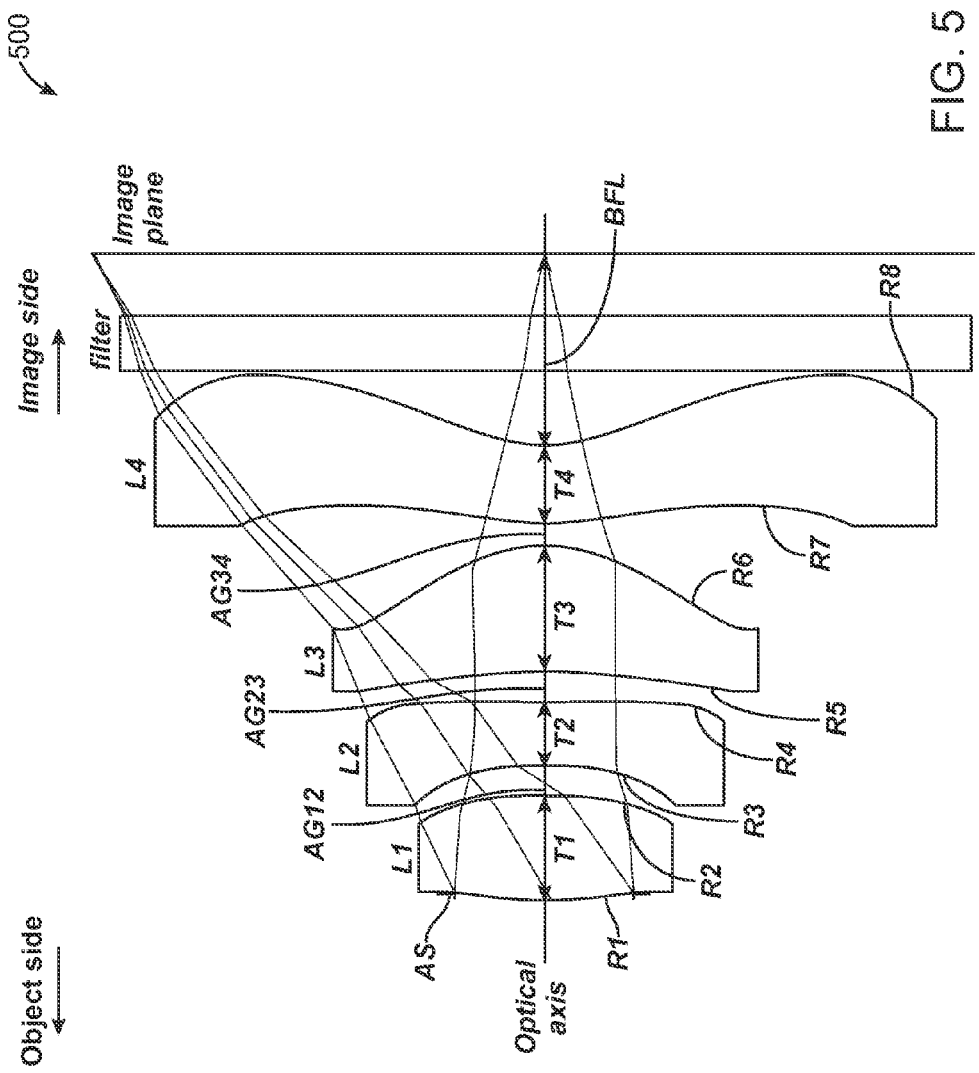
FIG. 5 is a schematic cross-section view of a four-element optical lens system according to a fifth embodiment of the present invention.

FIG. 5 is a schematic cross-section view of a four-element optical lens system 500 according to a fifth embodiment of the present invention. Optical lens system 500 has a similar structure as that of optical lens system 100 with the differences in the refractive index of the lens elements, the curvature radius, lens thickness, the air gap width between the lens elements, aspheric coefficients, the focal length and other relevant parameters.

Table 5A shows numeric lens data of optical lens system 500 according to the fifth embodiment of the present invention.

TABLE 5A

| Embd 5 | Curvature radius | Thickness or gap width | Refractive index | Abbe number | Focal Length | Material |
|---|---|---|---|---|---|---|
| Object | Infinity | Infinity | | | | |
| Aperture stop | Infinity | −0.0248 | | | | |
| L1 | 1.4104 | 0.4151 | 1.54 | 55.9 | 1.626 | plastic |
| | −2.1550 | 0.1122 | | | | |
| L2 | −2.3574 | 0.2584 | 1.64 | 23.2 | −2.218 | plastic |
| | 3.7582 | 0.1191 | | | | |
| L3 | −1.4229 | 0.4881 | 1.54 | 55.9 | 1.030 | plastic |
| | −0.4524 | 0.0907 | | | | |
| L4 | 1.1872 | 0.3060 | 1.53 | 56.1 | −1.428 | plastic |
| | 0.4227 | 0.2941 | | | | |
| IR cut filter | Infinity | 0.2100 | | | | |
| | Infinity | 0.2502 | | | | |
| Image plane | Infinity | | | | | |
| EFL | 1.589 | | | | | |
| HFOV | 44.040 | | | | | |
| Total length | 2.544 | | | | | |
| F number | 2.6 | | | | | |
| Image height | 1.542 | | | | | |

Table 4B shows numeric values of the four aspheric lens elements of the fourth embodiment.

TABLE 4B

| embd4 | Len1 | | Len2 | | Len3 | | Len4 | |
|---|---|---|---|---|---|---|---|---|
| K | 5.022443 | −0.2555256 | 5.011933 | −5.54225 | −1.025545 | −2.029915 | −52.06046 | −4.770441 |
| a4 | −0.4889516 | −1.8086249 | −2.9686286 | −1.073465 | 0.40618137 | −0.516706 | −0.0131272 | −0.2398313 |
| a6 | −1.7830461 | 1.1098339 | −6.2337172 | 1.3213397 | 2.0904094 | 0.23140279 | −0.708259 | 0.08450666 |
| a8 | −6.3824629 | −14.794417 | 37.556305 | −1.2548216 | −8.5977996 | 1.6428847 | 1.0497033 | 0.00916863 |
| a10 | 87.112099 | −15.401151 | −163.45972 | −3.432586 | 0.62974013 | 0.18975359 | −0.3956326 | −0.0206617 |
| a12 | −753.05999 | 239.28402 | 755.82049 | −0.2927667 | 35.193837 | 4.1134448 | −0.593459 | −0.0049918 |
| a14 | | | −733.56505 | 6.2080774 | −44.054981 | −6.7721877 | 0.64586687 | 0.00634921 |
| a16 | | | | | | | −0.1766432 | −0.001385 |

Table 5B shows numeric values of the four aspheric lens elements of the fifth embodiment.

TABLE 5B

| embd5 | Len1 | | Len2 | | Len3 | | Len4 | |
|---|---|---|---|---|---|---|---|---|
| K   | 3.93969     | 3.973878   | −4.879377  | −1.206852 | −0.2512571 | −2.189627  | −25.33486  | −4.383682 |
| a4  | −0.4724231  | −2.0376713 | −3.0768166 | −1.0997262| 0.34787181 | −0.5226429 | 0.05078803 | −0.2212357 |
| a6  | −0.2947361  | 0.94667829 | −6.8950118 | 1.8351821 | 2.3728528  | 0.6803764  | −0.7547448 | 0.0665891 |
| a8  | −14.555797  | 0.15757821 | 64.442685  | −2.5922012| −8.2995448 | 1.6413234  | 1.0224126  | 0.02167388 |
| a10 | −8.3959428  | −57.736358 | −180.43922 | −2.9443156| −0.1748616 | −0.4750618 | −0.3028135 | −0.023666 |
| a12 | 102.03064   | 125.86379  | 146.941    | 1.1150261 | 34.374043  | 2.6251497  | −0.5888657 | −0.0075762 |
| a14 |             |            | 131.14992  | −3.6107358| −46.456986 | −4.807407  | 0.57535571 | 0.00623134 |
| a16 |             |            |            |           |            |            | −0.1505329 | −0.0010521 |

Figure 10C:
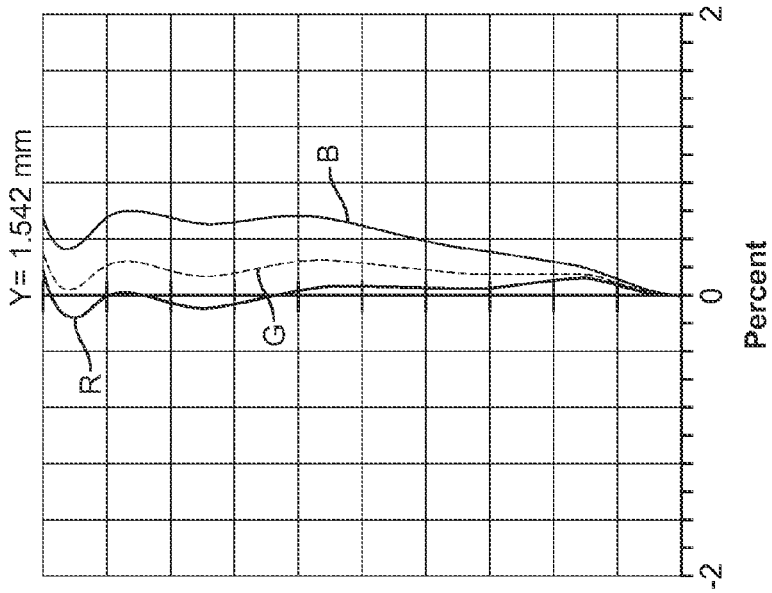
FIGS. 10A, 10B, and 10C show the respective longitudinal spherical aberration, sagittal and tangential astigmatic aberration, and distortion of the fifth embodiment.
Figure 10B:
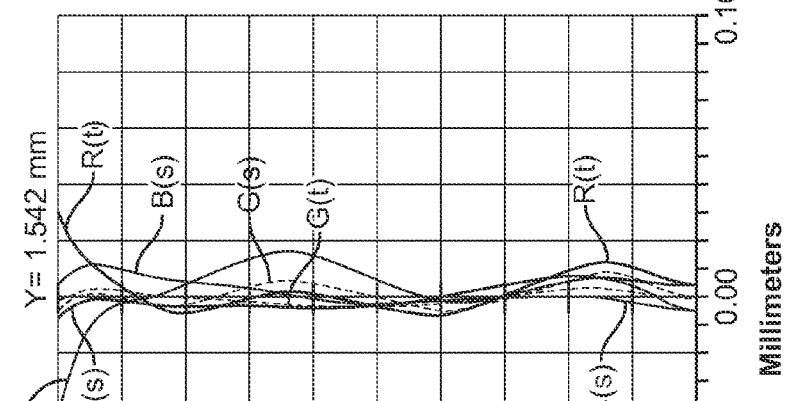
Figure 10A:
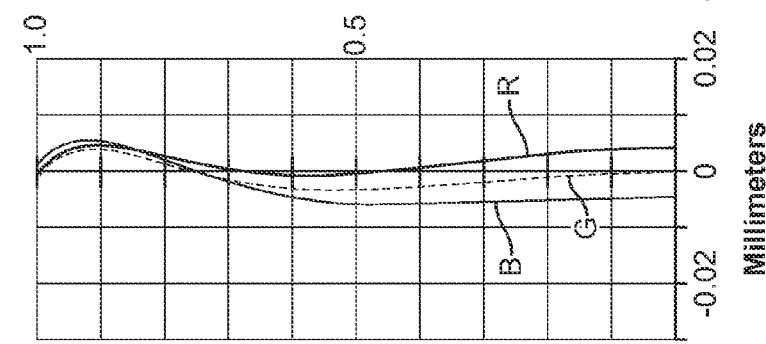

FIGS. 10A, 10B, and 10C show the respective longitudinal aberration, sagittal and tangential aberration, and distortion of the fifth embodiment. As shown in FIG. 10A, the longitudinal spherical aberration curves for the 470 nm ("G"), 555 nm ("B") and 650 nm ("R") wavelengths are within ±0.01 mm of the image point. The sagittal ("G(s)", "B(s)", "R(s)") and tangential ("G(t)", "B(t)", "R(t)") astigmatic aberration for the three green, blue, and red wavelengths are within ±0.05 mm (as shown in FIG. 10B). The distortion for the three green, blue, and red wavelengths is within ±0.8% as shown in FIG. 10C.

Each of the optical lens systems 100, 200, 300, 400, and 500 according to the embodiments of the present invention has the following optical characteristics and advantages. The first and third lens elements have a positive refractive power to provide the necessary positive refractive power to the optical lens system. Comparing with a single positive lens, the two positive lens elements share the positive refractive power, thereby easing the design difficulties and allowing a large error tolerance in manufacturing. The second lens element is designed to have a negative refractive power to correct aberration of the optical lens system.

The first lens element has a convex surface on the object side, the second lens element has a convex surface on the peripheral image side, the third lens element has a concave surface along the optical axis and a convex surface along the optical axis, the fourth lens element has a concave surface on the image side along the optical axis and a convex surface on the periphery of the image side. All surfaces of the lens elements are aspheric. Their combination achieves excellent image quality.

The surface shapes of the lens elements, their thickness, the distance between them, the location of the aperture stop can effectively reduce the overall length of a lens system while enhancing the optical performance and the manufacturability. According to embodiments of the present invention, the following conditions are to be satisfied to achieve a compact and lightweight lens system with good optical performance: the ratio of ALT/AAG is greater or equal to 3.5 (condition 1), where ALT is the total thickness of the first to the fourth lens elements along the optical axis, and AAG is the total width of the three air gaps from the first to fourth lens elements along the optical axis. Reducing either one of the two variables will reduce the total length of the lens system. However, the thickness of a lens element is subjected to the limits of the lens manufacturing process. The air gap between the lens elements does not have such limitation. Thus, the air gap between lens elements should be minimized to reduce the length of the lens system. For this reason, ALT/AAG is set to be greater or equal to 3.5. In a preferred embodiment, 3.5≤ALT/AAG<8.0.

The ratio of T1/T2 is to be equal to or less than 2.1; T3/T1 is set to be greater than 0.92 (condition 2). T1, T2, and T3 are the respective thickness of the first, second, and third lens elements. In order to prevent that any of the first, second and third lens elements to be too thick to affect the overall length of the lens system or to prevent any of these three lens elements to be too thin to affect the manufacturability, a ratio between any two of these three lens elements should be kept within a range, such as T1/T2 is less than or equal 2.1, preferably between 1.0 and 2.1, and T3/T1 is greater than or equal to 0.92, preferably between 0.92 and 1.5.

The ratio BFL/AG23 is to be equal to or less than 7.6, and BFL/T4 is to be equal to or less than 2.5 (condition 3). BFL is the distance between the fourth lens element and the image plane measured along the optical axis, and AG23 is the air gap between the second and third lens elements measured along the optical axis.

The ratio T1/AG23 is to be equal to or less than 5.0, T2/AG23 is equal to or less than 2.7 (condition 4). Minimizing T1 or T2 reduces the length of the lens system. AG23 is subjected to the concave surface on the object side of the third lens element near the optical axis, so that the reduction of AG23 is limited. It is thus required to have T1/AG23 be less than or equal to 5.0, preferably between 2.0 and 5.0, and T2/AG23 is less than or equal to 2.7, preferably between 1.5 and 2.5.

The ratio T2/AG12 is to be equal to or greater than 1.8. T4/AG12 is to be equal to or greater than 2.3 (condition 5). T2 and T4 are the respective thickness of the second and fourth lens elements. As explained above, manufacturing process capability sets a limit to the thickness of the lens element. The air gap between the lens elements does not have a limitation, Thus, T2/AG12 and T4/AG12 are designed to be large. According to the present invention, T2/AG12 is set to be greater than or equal to 1.8, preferably between 1.8 and 3.0. T4/AG12 is set to be greater than or equal to 2.3, preferably between 2.3 and 4.5.

The ratio T2/AAG is required to be equal to or greater than 0.7, T4/AAG is required to be equal to or greater than 0.92. AAG is the total width of all air gaps between the first and fourth lens elements. As explained above, the thickness of the lens element is subject to manufacturing process, whereas the air gaps can be configured with more flexibility. Thus, T2/AAG and T4/AAG are designed to be large. T2/AAG is set to be greater than or equal to 0.7, preferably between 0.7 and 1.5, T4/AAG is set to be greater than or equal to 0.95, preferably between 0.92 and 2.0.

The ratio AAG/AG12 is set to be greater than or equal to 2.2 (condition 7) to ensure that the air gaps between the lens elements are properly configured to prevent a too large air gap that affects the compactness of the lens system or to prevent a too small air gap that affects the lens system assembly.

Table 6 summaries values relating to the five above described embodiments.

TABLE 6

|  | embd 1 | embd 2 | embd 3 | embd 4 | embd 5 |
| --- | --- | --- | --- | --- | --- |
| ALT | 1.275 | 1.597 | 1.483 | 1.494 | 1.468 |
| AAG | 0.364 | 0.227 | 0.247 | 0.348 | 0.322 |
| BFL | 0.764 | 0.705 | 0.821 | 0.714 | 0.754 |
| ALT/AAG | 3.502 | 7.027 | 5.995 | 4.293 | 4.557 |
| T1/T2 | 1.591 | 2.052 | 1.925 | 1.563 | 1.606 |
| BFL/AG23 | 6.352 | 7.528 | 7.498 | 7.500 | 6.334 |
| T1/AG23 | 2.883 | 4.992 | 4.164 | 4.144 | 3.485 |
| T2/AG12 | 1.518 | 2.019 | 2.245 | 1.763 | 2.304 |
| BFL/T4 | 2.277 | 1.583 | 2.450 | 2.023 | 2.465 |
| T4/AG12 | 2.337 | 3.947 | 3.175 | 2.464 | 2.728 |
| T3/T1 | 1.080 | 0.974 | 0.999 | 1.251 | 1.176 |
| T2/AAG | 0.599 | 1.003 | 0.957 | 0.726 | 0.803 |
| AAG/AG12 | 2.536 | 2.013 | 2.345 | 2.430 | 2.871 |
| T2/AG23 | 1.812 | 2.432 | 2.164 | 2.651 | 2.170 |
| T4/AAG | 0.921 | 1.961 | 1.354 | 1.014 | 0.950 |

As can be seen from Table 6, the values of the respective embodiments are within the range of the numeric values of the given relations.

Figure 11:
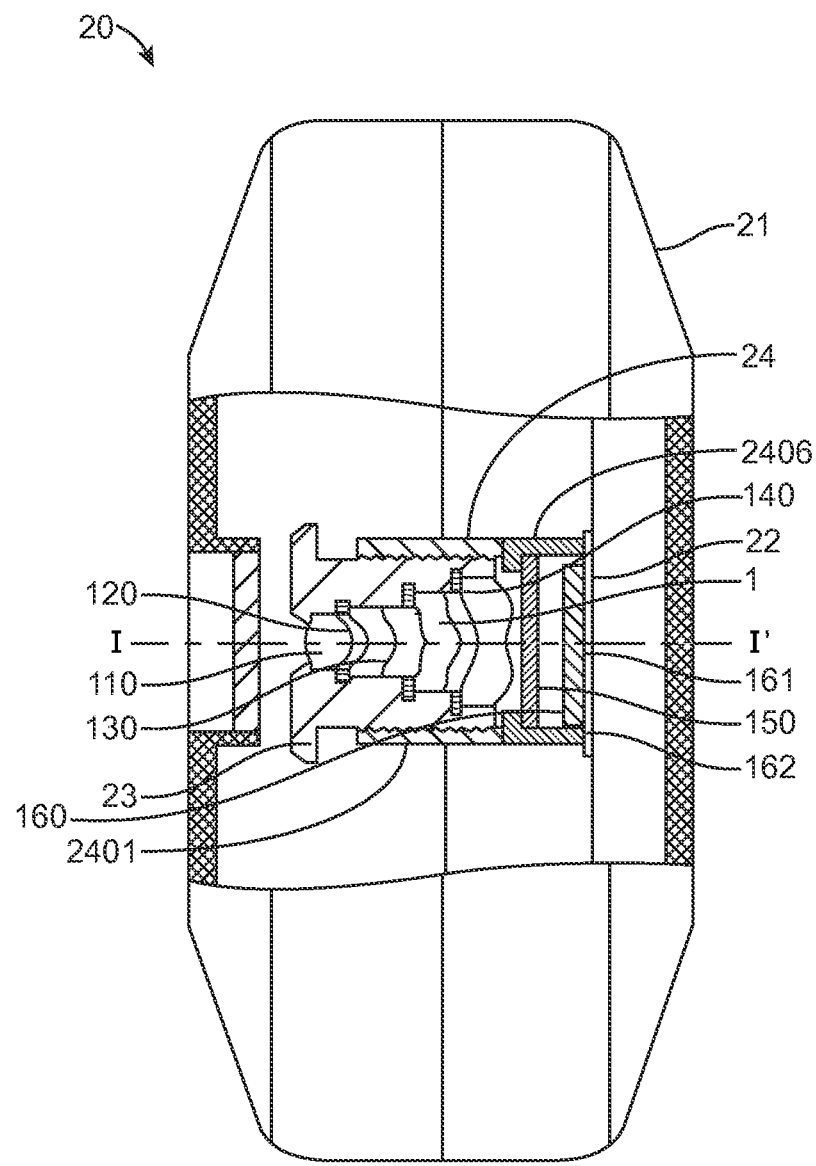
FIG. 11 is a schematic cross-sectional view of a portable electronic device with a built-in optical imaging module according to an embodiment of the present invention.

The present invention also provides a portable electronic device with a built-in optical imaging module that is compact and lightweight. FIG. 11 shows a portable electronic device 20 having a built-in optical image module according to an embodiment of the present invention. Portable electronic device 20 includes a case 21 and an optical imaging module 22 mounted in the case. The portable electronic device may be a mobile phone, a personal digital assistant (PDA), and the like. Optical imaging module 22 comprises an optical lens system 1, a lens barrel unit 23, a module housing unit 24 for mounting the lens barrel unit, a substrate 162 for securing the module housing unit, and an imaging sensor 161 disposed on a surface of the substrate 162 facing the optical lens system 1. In an embodiment, optical lens system 1 may include a four-element optical lens system such as one of the five embodiments described in above sections.

It will be appreciated that, although an optical filter 150 is shown in the exemplary embodiment, the optical filter may be omitted in some embodiments of the present invention. It should be appreciated that case 21, lens barrel unit 23, and/or module housing unit 24 can be assembled in a single component or in multiple components. Moreover, according to an embodiment, imaging sensor 161 can be directly connected with the substrate 162 using chip-on-board (COB) techniques. The COB has the advantage over the conventional chip scale package (CSP), in which a cover glass for protecting the imaging sensor 161 is not required.

In an embodiment, optical lens system 1 comprises four lens elements 110, 120, 130, and 140 each having a refractive power. The four lens elements are disposed in lens barrel unit 23 having an air gap therebetween. Optical lens system 1 satisfies the conditions (1) through (7) provided in sections above.

In an embodiment, module housing unit 24 includes a body 2401 configured to support lens barrel unit 23 and a rear base 2406 configured to support imaging sensor 161. Lens barrel unit 23 and body 2401 are arranged concentrically with the optical axis IT, and the lens barrel unit is disposed on the inner circumferential side of the body 2401.

According to embodiments of the present invention, the optical lens system 1 has a total length of 2.5 mm so that the portable device 20 can be made to be compact and lightweight while provide good optical characteristics and performance. Thus, the present invention not only provides the economic benefits of reducing the amount of assembly materials, but also the advantages of a compact and lightweight design to satisfy consumer demand.

Figure 12:
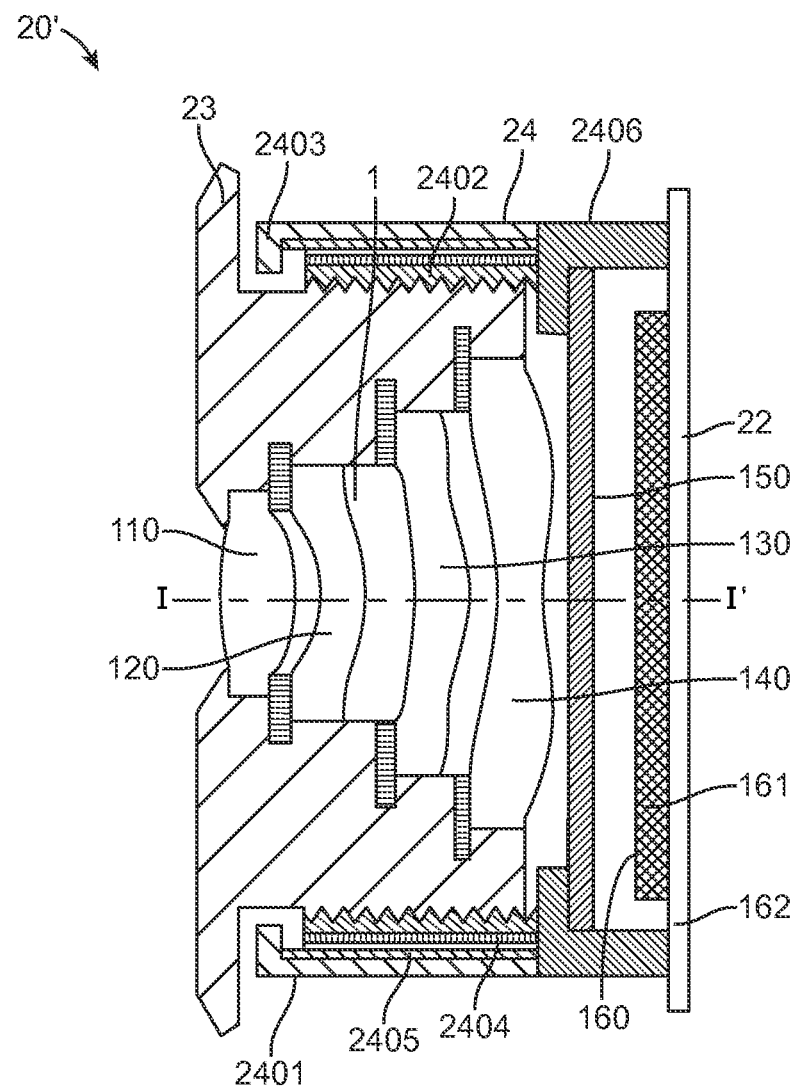
FIG. 12 is a schematic cross-sectional view of a portable electronic device with a built-in optical imaging module according to another embodiment of the present invention.
Figure 13:
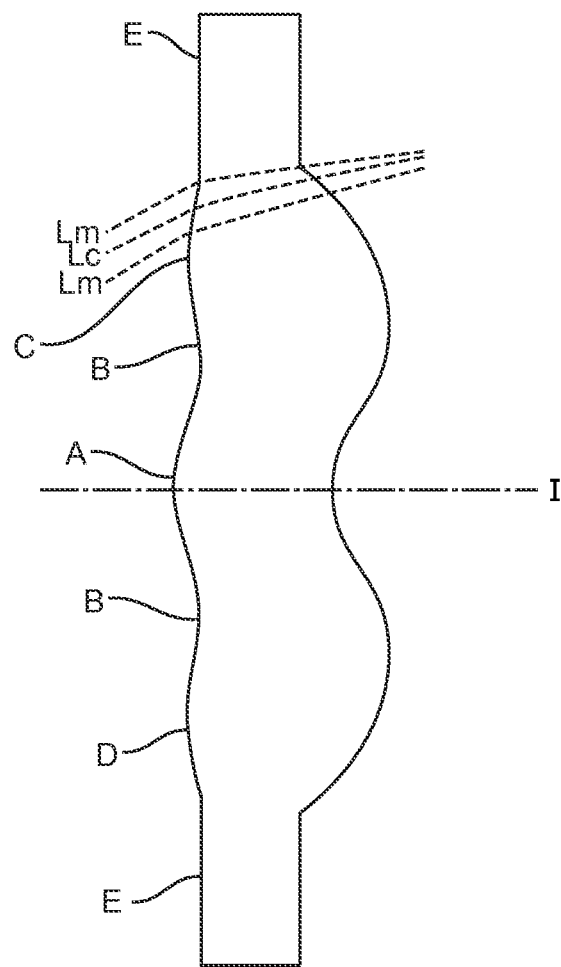
FIG. 13 is a cross section view of an exemplary lens element to explain the terms used in the present invention.

FIG. 12 shows a portable electronic device 20' in another embodiment of the present invention. Portable electronic device 20' is similar to electronic device 20 on that the same reference numerals are used to identify the same parts. The primary difference is that body 2401 comprises a first body unit 2402, a second body unit 2403, a coil 2404, and a magnetic component 2405. First body unit 2402 and an outer circumference side of lens barrel unit 23 are disposed adjacent (and interlocked with) each other and concentric along the optical axis second body unit 2403 has a first terminal facing the object side and a second terminal facing the image side. Coil 2404 is disposed between the outer circumferential surface of first body unit 2402 and inner circumferential surface of second body unit 2403. Rear base 2406 is connected with the second terminal of the second body unit 2403.

The first body unit 2402 moves lens barrel unit 23 and the optical lens system 1 mounted on the lens barrel unit back and forth in the direction of the optical axis. Optical lens system 1 comprises four lens elements 110, 120, 130, and 140 each having a refractive power. The four lens elements are disposed in lens barrel unit 23 having an air gap therebetween. Optical lens system 1 satisfies the conditions (1) through (7) provided in sections above according to embodiments of the present invention. In other words, the distance between the fourth lens element and the image plane (i.e., the back focal length BFL) varies with the movement the lens barrel unit.

Because the optical lens system has a total length of 2.5 mm, the portable device can be built compact and lightweight. The present invention has broad applications that are not limited to portable devices. While the present invention has been described with respect to what is considered as preferred embodiments, it is to be understood that the invention is not limited to the disclosed embodiments. The invention is intended to cover various modifications and equivalent arrangements included within the scope of the appended claims.

What is claimed is:

1. An imaging optical system comprising, in order from an object side to an image side:

an aperture stop;

a first lens element with a positive refractive power having a convex object-side surface;

a second lens element with a negative refractive power having a convex image-side surface in the vicinity of an outer circumference;

a third lens element with a positive refractive power having a concave object-side surface in a vicinity of an optical axis and a convex image-side surface in the vicinity of the optical axis; and a fourth lens element having a concave image-side surface in the vicinity of the optical axis and a convex image-side surface in the vicinity of the outer circumference;

wherein a sum of thicknesses of the first, second, third, and fourth lens elements is ALT and a sum of total air gaps between the first, second, third, and fourth lens elements is AAG, and they satisfy the relation:

$3.5 \leq ALT/AAG;$ wherein a thickness of the first lens element is T1, an air gap between the second and third lens elements is AG23, and they satisfy the relation:

$T1/AG23 \leq 5.0;$ and wherein a back focal length is BFL, and it satisfies the relation:

$BFL/AG23 \leq 7.6.$

2. The imaging optical system of claim 1, wherein a thickness of the second lens element is T2, and it satisfies the relation:

$T1/T2 \leq 2.1$.

3. The imaging optical system of claim 2, wherein an air gap between the first and second lens elements is AG12, and it satisfies the relation:

$1.8 \leq T2/AG12$.

4. The imaging optical system of claim 2, wherein the third lens element comprises a concave image-side surface in the vicinity of the outer circumference.

5. The imaging optical system of claim 1, wherein a thickness of the second lens element is T2, and it satisfies the relation:

$T1/T2 \leq 2.1$.

6. The imaging optical system of claim 5, wherein a thickness of the fourth lens element is T4, and it satisfies the relation:

$BFL/T4 \leq 2.5$.

7. The imaging optical system of claim 5, wherein an air gap between the first and second lens elements is AG12, and it satisfies the relation:

$2.3 \leq T4/AG12$.

8. The imaging optical system of claim 1, wherein BFL and AG23 satisfy the relation:

$6.3 \leq BFL/AG23$.

9. The imaging optical system of claim 1, wherein a thickness of the third lens element is T3, and it satisfies the relation:

$0.92 \leq T3/T1$.

10. The imaging optical system of claim 9, wherein a thickness of the second lens element is T2, and it satisfies the relation:

$0.7 \leq T2/AAG$.

11. The imaging optical system of claim 1, wherein a thickness of the second lens element is T2, and it satisfies the relation:

$T1/T2 \leq 2.1$.

12. The imaging optical system of claim 11, wherein an air gap between the first and second lens elements is AG12, and it satisfies the relation:

$2.2 \leq AAG/AG12$.

13. The imaging optical system of claim 12, wherein the air gap between the second and third lens elements AG23 satisfies the relation:

$T2/AG23 \leq 2.7$.

14. The imaging optical system of claim 13, wherein a thickness of the fourth lens element is T4, and it satisfies the relation:

$0.92 \leq T4/AAG$.

15. An electronic device with a digital camera, the electronic device comprising:
a module housing unit;
a lens barrel mounted in the module housing unit;
an optical lens module assembled in the lens barrel, the optical lens module comprising:
a first lens element with a positive refractive power having a convex object-side surface;
a second lens element with a negative refractive power having a convex image-side surface in the vicinity of an outer circumference;
a third lens element with a positive refractive power having a concave object-side surface in a vicinity of an optical axis and a convex image-side surface in the vicinity of the optical axis; and
a fourth lens element having a concave image-side surface in the vicinity of the optical axis and a convex image-side surface in the vicinity of the outer circumference;
wherein a sum of thicknesses of the first, second, third, and fourth lens elements is ALT and a sum of total air gaps between the first, second, third, and fourth lens elements is AAG, and they satisfy the relation:

$3.5 \leq ALT/AAG$;

wherein a thickness of the first lens element is T1, an air gap between the second and third lens elements is AG23, and they satisfy the relation:

$T1/AG23 \leq 5.0$; and wherein a back focal length is BFL, and it satisfies the relation:

$BFL/AG23 \leq 7.6$.

16. The electronic device of claim 15, wherein the lens barrel is movable in a direction of the optical axis.

17. An imaging optical system comprising, in order from an object side to an image side:
an aperture stop;
a first lens element with a positive refractive power having a convex object-side surface;
a second lens element with a negative refractive power having a convex image-side surface in the vicinity of an outer circumference;
a third lens element with a positive refractive power having a concave object-side surface in a vicinity of an optical axis and a convex image-side surface in the vicinity of the optical axis; and
a fourth lens element having a concave image-side surface in the vicinity of the optical axis and a convex image-side surface in the vicinity of the outer circumference;
wherein a sum of thicknesses of the first, second, third, and fourth lens elements is ALT, a sum of total air gaps between the first, second, third, and fourth lens elements is AAG, a back focal length is BFL, and an air gap between the second and third lens elements is AG23, wherein they satisfy the relation:

$3.5 \leq ALT/AAG$; and $6.3 \leq BFL/AG23 \leq 7.6$.

* * * * *